(12) United States Patent
Chen et al.

(10) Patent No.: US 9,059,951 B2
(45) Date of Patent: *Jun. 16, 2015

(54) METHOD AND APPARATUS FOR SPAM MESSAGE DETECTION

(71) Applicant: INTERNATIONAL BUSINESS MACHINES CORPORATION, Armonk, NY (US)

(72) Inventors: Xiao Yan Chen, Beijing (CN); Chen Wang, Beijing (CN); Chun Ying, Beijing (CN); Yi Bo Zhang, Beijing (CN); Yanfeng Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,044

(22) Filed: Jun. 21, 2013

(65) Prior Publication Data

US 2014/0156766 A1 Jun. 5, 2014

Related U.S. Application Data

(63) Continuation of application No. 12/821,230, filed on Jun. 23, 2010, now Pat. No. 8,479,287.

(30) Foreign Application Priority Data

Jun. 30, 2009 (CN) .......................... 2009 1 0139811

(51) Int. Cl.
*H04L 12/58* (2006.01)
*H04L 29/06* (2006.01)

(52) U.S. Cl.
CPC .............. *H04L 51/12* (2013.01); *H04L 12/585* (2013.01); *H04L 63/1441* (2013.01)

(58) Field of Classification Search
CPC ....................................................... H04L 12/585
USPC ............................................................ 726/22
See application file for complete search history.

(56) References Cited

U.S. PATENT DOCUMENTS 8,479,287 B2 * 7/2013 Chen et al. ...................... 726/22
2004/0260776 A1 12/2004 Starbuck et al.
(Continued)

FOREIGN PATENT DOCUMENTS

| CN | 101415188 | 4/2009 |
| EP | 1613103 | 1/2006 |
| JP | 2006-164246 | 6/2006 |

OTHER PUBLICATIONS

Robert K. Rowe et al, Multi spectral Fingerprint Biometrics, Proceedings of the 2005 IEEE Workshop on Information Assurance and Security United States Military Academy, NY.

*Primary Examiner* — Jacob Lipman
(74) *Attorney, Agent, or Firm* — Tutunjian & Bitetto, P.C.; Jennifer R. Davis

(57) ABSTRACT

A method, apparatus and computer program product for spam message detection. The method includes collecting time domain transmission characteristic of a message source; computing frequency domain transmission characteristic of the message source with the time domain transmission characteristic of the message source; and identifying the message source to be a spammer in response to the frequency domain transmission characteristic of the message source satisfying predefined criteria; wherein the steps of the method are carried out using a computer device. An apparatus and computer program product for carrying out the above method is also provided.

19 Claims, 10 Drawing Sheets

(56) References Cited

U.S. PATENT DOCUMENTS

| | | |
|---|---|---|
| 2007/0204341 A1 | 8/2007 | Rand et al. |
| 2008/0127345 A1 | 5/2008 | Holtmanns |
| 2009/0022149 A1 | 1/2009 | Rosenberg et al. |
| 2009/0022155 A1 | 1/2009 | Rosenberg et al. |

\* cited by examiner

Type of template: spammer
Length of time domain sample interval: 4000ms

| 0, | 0, | 0, | 0, | 0, | 0, | 0, | 0, | 0, | 0 |
|---|---|---|---|---|---|---|---|---|---|
| 0, | 0, | 0, | 0, | 0, | 0, | 0, | 0, | 0, | 0 |
| 0, | 0, | 0, | 0, | 0, | 0, | 0, | 0, | 0, | 0 |
| 0, | 0, | 1, | 0, | 0, | 0, | 0, | 0, | 0, | 0 |
| 6, | 0, | 0, | 0, | 0, | 0, | 0, | 0, | 0, | 0 |
| 5, | 0, | 0, | 0, | 0, | 0, | 0, | 0, | 0, | 0 |
| 6, | 3, | 0, | 0, | 0, | 0, | 0, | 0, | 0, | 0 |
| 9, | 1, | 0, | 1, | 0, | 0, | 0, | 0, | 0, | 0 |
| 6, | 2, | 3, | 1, | 0, | 1, | 0, | 0, | 0, | 0 |
| 5, | 1, | 2, | 1, | 0, | 1, | 0, | 0, | 0, | 2 |
| 12, | 6, | 6, | 5, | 3, | 2, | 0, | 0, | 0, | 0 |
| 8, | 6, | 18, | 11, | 13, | 15, | 9, | 2, | 3, | 4 |
| 4, | 2, | 42, | 48, | 23, | 41, | 25, | 28, | 9, | 28 |
| 8, | 2, | 101, | 86, | 62, | 127, | 54, | 98, | 64, | 106 |
| 11, | 10, | 184, | 199, | 200, | 273, | 213, | 241, | 187, | 318 |
| 31, | 32, | 253, | 367, | 335, | 425, | 384, | 423, | 373, | 512 |
| 47, | 29, | 278, | 361, | 391, | 384, | 418, | 422, | 476, | 399 |
| 58, | 45, | 260, | 290, | 341, | 203, | 307, | 257, | 300, | 193 |
| 78, | 36, | 205, | 158, | 158, | 95, | 132, | 103, | 146, | 47 |
| 105, | 58, | 121, | 68, | 52, | 34, | 53, | 27, | 40, | 10 |
| 148, | 108, | 91, | 19, | 24, | 9, | 9, | 11, | 17, | 3 |
| 180, | 125, | 36, | 8, | 10, | 6, | 5, | 3, | 7, | 2 |
| 200, | 173, | 13, | 1, | 3, | 1, | 2, | 0, | 3, | 0 |
| 180, | 252, | 4, | 2, | 1, | 0, | 5, | 3, | 1, | 1 |
| 163, | 229, | 6, | 0, | 1, | 1, | 3, | 1, | 0, | 0 |
| 143, | 203, | 2, | 0, | 0, | 2, | 0, | 4, | 0, | 0 |
| 105, | 146, | 0, | 0, | 2, | 2, | 1, | 3, | 0, | 0 |
| 57, | 93, | 0, | 0, | 6, | 3, | 5, | 0, | 0, | 0 |
| 27, | 37, | 0, | 0, | 1, | 1, | 1, | 0, | 0, | 1 |
| 14, | 24, | 0, | 0, | 0, | 0, | 0, | 0, | 0, | 0 |
| 6, | 2, | 0, | 0, | 0, | 0, | 0, | 0, | 0, | 0 |
| 4, | 1, | 0, | 0, | 0, | 0, | 0, | 0, | 0, | 0 |

FIG. 3A

Type of template: spammer
Length of time domain sample interval: 16000ms

| | | | | | | | | | |
|---|---|---|---|---|---|---|---|---|---|
| 0, | 0, | 0, | 0, | 0, | 0, | 0, | 0, | 0, | 0 |
| 0, | 0, | 0, | 0, | 0, | 0, | 0, | 0, | 0, | 0 |
| 0, | 2, | 0, | 0, | 0, | 0, | 0, | 0, | 0, | 0 |
| 0, | 4, | 0, | 0, | 0, | 0, | 0, | 0, | 0, | 0 |
| 1, | 2, | 0, | 0, | 0, | 0, | 0, | 0, | 0, | 0 |
| 3, | 6, | 0, | 1, | 0, | 0, | 0, | 0, | 0, | 0 |
| 1, | 2, | 2, | 0, | 0, | 0, | 0, | 0, | 0, | 0 |
| 4, | 7, | 2, | 1, | 2, | 1, | 0, | 1, | 1, | 0 |
| 4, | 9, | 5, | 1, | 0, | 3, | 1, | 3, | 0, | 0 |
| 3, | 17, | 7, | 12, | 7, | 5, | 3, | 4, | 6, | 0 |
| 4, | 25, | 9, | 8, | 10, | 10, | 11, | 10, | 2, | 0 |
| 3, | 42, | 16, | 22, | 12, | 22, | 18, | 15, | 11, | 5 |
| 4, | 65, | 49, | 56, | 34, | 36, | 45, | 42, | 40, | 22 |
| 5, | 119, | 122, | 104, | 97, | 96, | 69, | 109, | 94, | 70 |
| 4, | 163, | 219, | 217, | 203, | 226, | 199, | 211, | 209, | 282 |
| 3, | 247, | 388, | 364, | 386, | 399, | 453, | 411, | 409, | 674 |
| 7, | 284, | 320, | 375, | 388, | 407, | 386, | 415, | 427, | 382 |
| 12, | 259, | 237, | 214, | 268, | 216, | 244, | 213, | 239, | 130 |
| 14, | 164, | 113, | 131, | 115, | 123, | 110, | 103, | 98, | 28 |
| 14, | 106, | 66, | 63, | 39, | 45, | 41, | 43, | 42, | 10 |
| 14, | 64, | 23, | 22, | 24, | 18, | 22, | 22, | 16, | 8 |
| 9, | 20, | 21, | 17, | 15, | 4, | 7, | 3, | 18, | 5 |
| 10, | 11, | 14, | 10, | 7, | 9, | 3, | 10, | 7, | 2 |
| 16, | 3, | 2, | 2, | 3, | 1, | 4, | 4, | 2, | 0 |
| 17, | 0, | 4, | 1, | 5, | 0, | 2, | 3, | 1, | 2 |
| 8, | 1, | 3, | 1, | 2, | 2, | 0, | 1, | 0, | 3 |
| 17, | 1, | 1, | 0, | 4, | 0, | 3, | 0, | 0, | 0 |
| 46, | 0, | 0, | 1, | 1, | 0, | 0, | 0, | 1, | 0 |
| 49, | 0, | 0, | 0, | 1, | 0, | 1, | 0, | 0, | 0 |
| 132, | 0, | 0, | 0, | 0, | 0, | 1, | 0, | 0, | 0 |
| 336, | 0, | 0, | 0, | 0, | 0, | 0, | 0, | 0, | 0 |
| 883, | 0, | 0, | 0, | 0, | 0, | 0, | 0, | 0, | 0 |

FIG. 3B

Type of template: spammer
Length of time domain sample interval: 128000ms

| 0, | 2, | 0, | 0, | 0, | 0, | 0, | 0, | 0, | 0 |
|---|---|---|---|---|---|---|---|---|---|
| 0, | 0, | 0, | 0, | 0, | 0, | 0, | 0, | 0, | 0 |
| 0, | 2, | 0, | 1, | 0, | 0, | 0, | 0, | 0, | 0 |
| 0, | 6, | 2, | 1, | 0, | 0, | 0, | 0, | 0, | 0 |
| 0, | 3, | 1, | 1, | 1, | 0, | 0, | 0, | 0, | 0 |
| 0, | 6, | 4, | 2, | 0, | 0, | 0, | 0, | 0, | 0 |
| 0, | 3, | 2, | 2, | 1, | 1, | 0, | 0, | 0, | 0 |
| 0, | 2, | 1, | 0, | 0, | 7, | 0, | 1, | 1, | 0 |
| 0, | 3, | 1, | 5, | 2, | 2, | 1, | 1, | 1, | 0 |
| 0, | 4, | 1, | 3, | 1, | 6, | 3, | 0, | 2, | 0 |
| 0, | 4, | 3, | 3, | 1, | 5, | 2, | 2, | 2, | 1 |
| 0, | 9, | 5, | 1, | 6, | 7, | 1, | 6, | 6, | 2 |
| 0, | 8, | 9, | 6, | 9, | 12, | 6, | 5, | 11, | 5 |
| 0, | 9, | 7, | 18, | 8, | 18, | 10, | 23, | 20, | 16 |
| 0, | 31, | 26, | 28, | 31, | 25, | 17, | 30, | 30, | 32 |
| 4, | 36, | 28, | 52, | 46, | 52, | 57, | 72, | 51, | 81 |

| 3, | 26, | 34, | 34, | 57, | 63, | 62, | 55, | 62, | 52 |
|---|---|---|---|---|---|---|---|---|---|
| 7, | 13, | 35, | 29, | 30, | 19, | 25, | 24, | 20, | 33 |
| 5, | 24, | 24, | 13, | 14, | 13, | 20, | 9, | 17, | 11 |
| 1, | 23, | 14, | 13, | 6, | 4, | 14, | 8, | 8, | 2 |
| 3, | 6, | 11, | 2, | 8, | 0, | 9, | 0, | 6, | 2 |
| 3, | 9, | 8, | 7, | 8, | 5, | 6, | 3, | 2, | 1 |
| 6, | 6, | 2, | 9, | 1, | 0, | 4, | 0, | 1, | 3 |
| 12, | 3, | 6, | 2, | 3, | 2, | 3, | 1, | 0, | 0 |
| 7, | 2, | 3, | 0, | 2, | 0, | 0, | 0, | 1, | 0 |
| 14, | 0, | 4, | 3, | 1, | 0, | 0, | 1, | 0, | 0 |
| 12, | 0, | 2, | 5, | 2, | 0, | 1, | 0, | 0, | 0 |
| 18, | 0, | 4, | 1, | 3, | 0, | 0, | 0, | 0, | 0 |
| 16, | 1, | 2, | 0, | 0, | 0, | 0, | 0, | 0, | 0 |
| 23, | 0, | 1, | 0, | 0, | 0, | 0, | 0, | 0, | 0 |
| 25, | 0, | 0, | 0, | 0, | 0, | 0, | 0, | 0, | 0 |
| 82, | 0, | 1, | 0, | 0, | 0, | 0, | 0, | 0, | 0 |

FIG. 3C

Type of template: spammer
Length of time domain sample interval: 16000ms

| | | | | | | | | | |
|---|---|---|---|---|---|---|---|---|---|
| 0, | 0, | 0, | 0, | 0, | 0, | 0, | 0, | 0, | 0 |
| 0, | 1, | 0, | 0, | 0, | 0, | 0, | 0, | 0, | 0 |
| 0, | 0, | 0, | 0, | 0, | 0, | 0, | 0, | 0, | 0 |
| 0, | 0, | 0, | 0, | 0, | 0, | 0, | 0, | 0, | 0 |
| 0, | 1, | 0, | 0, | 0, | 0, | 0, | 0, | 0, | 0 |
| 0, | 0, | 0, | 0, | 0, | 0, | 0, | 0, | 0, | 0 |
| 0, | 0, | 0, | 0, | 0, | 0, | 0, | 0, | 0, | 0 |
| 0, | 0, | 0, | 0, | 0, | 0, | 0, | 0, | 0, | 0 |
| 0, | 0, | 0, | 0, | 0, | 0, | 0, | 0, | 0, | 0 |
| 0, | 1, | 0, | 0, | 0, | 0, | 1, | 0, | 0, | 0 |
| 0, | 1, | 1, | 0, | 1, | 0, | 0, | 1, | 0, | 0 |
| 0, | 2, | 0, | 2, | 1, | 0, | 0, | 0, | 0, | 0 |
| 0, | 1, | 0, | 1, | 1, | 0, | 1, | 2, | 0, | 0 |
| 0, | 2, | 5, | 3, | 3, | 2, | 3, | 1, | 2, | 2 |
| 0, | 3, | 6, | 6, | 2, | 4, | 7, | 6, | 7, | 11 |
| 6, | 17, | 18, | 17, | 25, | 24, | 20, | 22, | 24, | 29 |
| 6, | 21, | 20, | 25, | 29, | 24, | 29, | 31, | 26, | 25 |
| 3, | 4, | 11, | 6, | 4, | 10, | 4, | 1, | 8, | 2 |
| 2, | 6, | 5, | 1, | 3, | 4, | 4, | 0, | 1, | 0 |
| 1, | 6, | 1, | 5, | 0, | 1, | 0, | 5, | 1, | 1 |
| 1, | 0, | 1, | 1, | 0, | 1, | 1, | 0, | 1, | 0 |
| 1, | 2, | 0, | 3, | 0, | 0, | 0, | 1, | 0, | 0 |
| 4, | 1, | 1, | 0, | 0, | 0, | 0, | 0, | 0, | 0 |
| 1, | 1, | 0, | 0, | 0, | 0, | 0, | 0, | 0, | 0 |
| 1, | 0, | 0, | 0, | 1, | 0, | 0, | 0, | 0, | 0 |
| 1, | 0, | 1, | 0, | 0, | 0, | 0, | 0, | 0, | 0 |
| 1, | 0, | 0, | 0, | 0, | 0, | 0, | 0, | 0, | 0 |
| 3, | 0, | 0, | 0, | 0, | 0, | 0, | 0, | 0, | 0 |
| 5, | 0, | 0, | 0, | 0, | 0, | 0, | 0, | 0, | 0 |
| 3, | 0, | 0, | 0, | 0, | 0, | 0, | 0, | 0, | 0 |
| 10, | 0, | 0, | 0, | 0, | 0, | 0, | 0, | 0, | 0 |
| 21, | 0, | 0, | 0, | 0, | 0, | 0, | 0, | 0, | 0 |

FIG. 3D

METHOD AND APPARATUS FOR SPAM MESSAGE DETECTION

CROSS REFERENCE TO RELATED APPLICATION

This application claims priority under 35 U.S.C. §119 from Chinese Patent Application No. 200910139811.9 filed Jun. 30, 2009, the entire contents of which are incorporated herein by reference.

This application is a Continuation application of allowed co-pending U.S. patent application Ser. No. 12/821,230 filed on Jun. 23, 2010, incorporated herein by reference in its entirety.

BACKGROUND OF THE INVENTION

1. Field of the Invention

The present invention relates to the field of information processing, and more particularly, to a method and apparatus for spam message detection.

2. Description of the Related Art

Spam messages and spam mail affect user experience and system performance. There exist a variety of approaches for detecting spam messages. One such approach is a user feedback based approach, where a user identifies and reports a spammer. According to another approach, such as a social network based approach, a social network archive is established for each user and a message transmitted by the user to other users outside of the social network is determined to be a spam message. A relatively large data record system is required to store the reported spammer or the social network archive, and such a data record system needs to be shared among various service operators, which complicates the feasibility of using these systems across various service operators.

According to a message content based approach, a message will be determined to be a spam message if it contains a preset keyword. In this approach, an excessively small set of keywords will cause a high false negative rate, while an excessively large set of keywords will affect a detection speed. This may lead to privacy concerns since the approach checks message content. In addition, the spammer can escape detection in a simple, flexible manner such as inserting a space within a keyword. In another approach based on message transmission speed, a message source can be determined to be a spammer if it transmits bulk messages or repeated messages in a short span of time. The spammer can reduce the number of messages transmitted by each message source within the short span of time by making multiple message sources transmit messages in turns, while a normal user may transmit bulk messages in a short span of time under some circumstances.

SUMMARY OF THE INVENTION

Embodiments of the invention propose a method for detecting spam message such that a spammer cannot escape detection through the above-mentioned simple means.

According to an embodiment of the invention, a method for spam message detection is presented. The method includes:

collecting a time domain transmission characteristic of a message source;

computing a frequency of the domain transmission which is characteristic of the message source using the time domain transmission characteristic of the message source; and identifying the message source as a spammer in response to the frequency domain transmission characteristic of the message source meeting a predefined condition;

wherein the steps of the method are carried out using a computer device.

According to another embodiment of the invention, an apparatus for detecting a spam message is presented. The apparatus includes:

a collection means configured to collect time domain transmission characteristic of a message source;

a computation means configured to compute frequency domain transmission characteristic of the message source using the time domain transmission characteristic of the message source; and an identification means configured to identify the message source as a spammer in response to the frequency domain transmission characteristic of the message source meeting a predefined condition.

According to yet another embodiment of the invention, a computer program product for detecting a spam message is presented. The computer program product includes:

a computer readable storage medium having computer readable program code. The computer readable program code includes computer readable program code configured to execute the above method. The method includes:

collecting a time domain transmission characteristic of a message source;

computing a frequency domain transmission characteristic of the message source using the time domain transmission characteristic of the message source; and identifying the message source as a spammer in response to the frequency domain transmission characteristic of the message source meeting a predefined condition;

wherein the steps of the method are carried out using a computer device.

Therefore, in accordance with the embodiment of the invention, a spammer that makes multiple message sources transmit messages in turns can be detected through the frequency domain transmission characteristic, thereby compensating or ameliorating any defects in the previously mentioned approaches.

BRIEF DESCRIPTION OF THE DRAWINGS

FIGS. 3(A) to 3(D) show a model parameter distribution of a known spammer under four different time domain sample intervals.

DETAILED DESCRIPTION OF THE PREFERRED EMBODIMENTS

Embodiments of a method and apparatus for spam message detection provided by the invention will be described in detail below and should be read in conjunction with the accompanying drawings. When a first element is depicted to be connected to a second element, the first element not only can be directly connected to the second element, but can also be indirectly connected to the second element through a third element. Further, for the sake of clarity, some elements that are unnecessary to fully understand embodiments of the present invention are omitted.

Figure 1A:
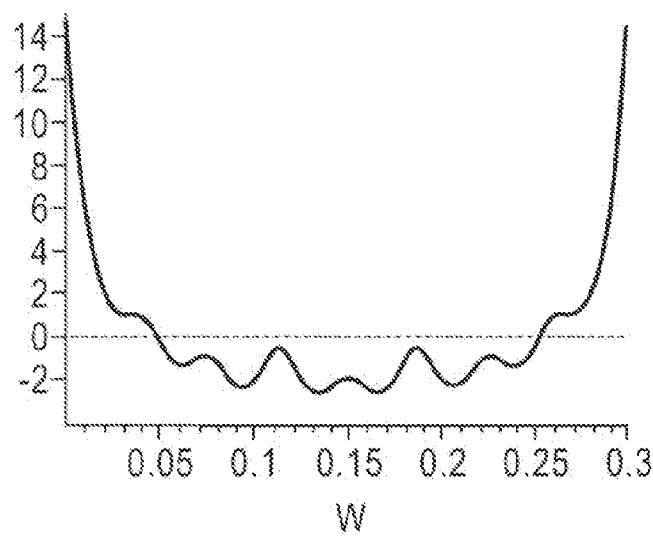
FIGS. 1(A) to 1(C) are diagrams illustrating the frequency domain transmission characteristics for different types of message sources.
Figure 1B:
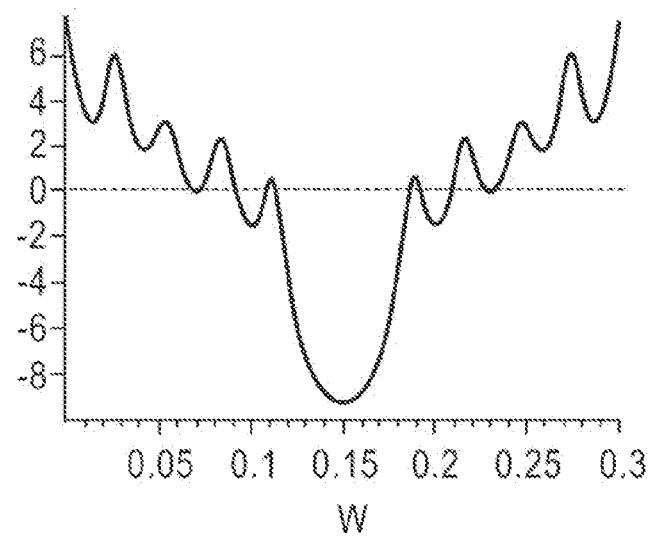
Figure 1C:
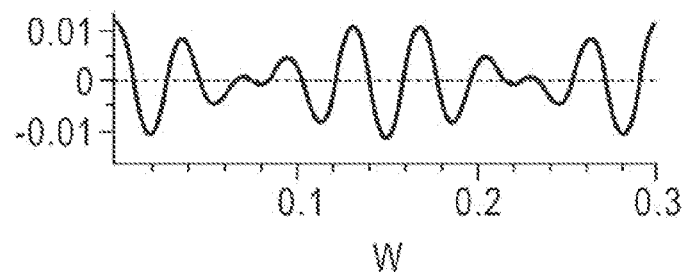

FIGS. 1(A) to 1(C) are a diagram of frequency domain transmission characteristic for different types of message sources. FIG. 1(A) is a diagram of frequency domain transmission characteristic of a message source that transmits messages in bursts. FIG. 1(B) is a diagram of frequency domain transmission characteristic of a message source that transmits messages in periodical intervals. FIG. 1(C) is a diagram of frequency domain transmission characteristic of a message source that transmits messages in a random manner.

The message source in FIG. 1(A) transmits bulk spam messages in a short time interval, thereby transmitting numerous spam messages before such a behavior can be detected by the system. Such a spammer can be detected as disclosed previously by the approach based on message transmission speed.

The message source in FIG. 1(B) is one message source within a group of message sources. This group of message sources takes turns to transmit messages. For each message source within the group, the transmission speed does not reach a threshold, and therefore will not be identified as a spammer by the approach based on message transmission speed. The message source in FIG. 1(C) corresponds to that of a normal user, which transmits messages in a random manner, thus its frequency domain transmission characteristic does not show any regularity.

As shown in FIGS. 1(A) to 1(C), the frequency domain transmission characteristics of different types of message sources have significant differences. Thus, the type to which each message source belongs can be determined from the corresponding frequency domain transmission characteristic, thereby determining whether the message source is a spammer.

Figure 2:
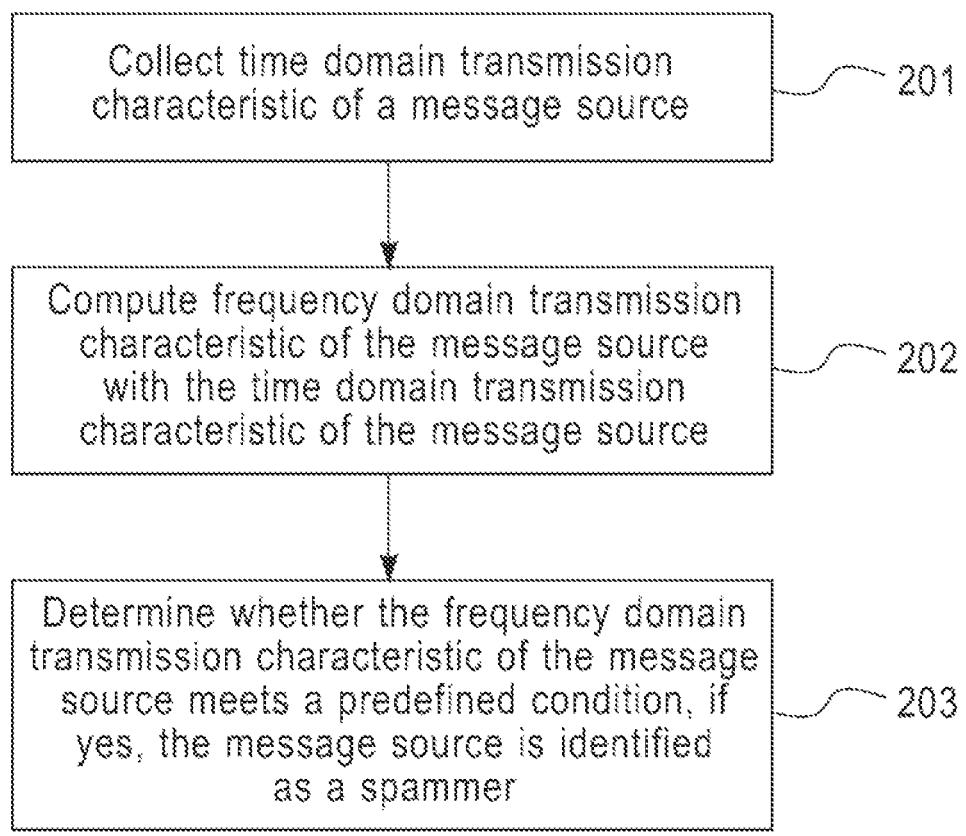
FIG. 2 is a block diagram of a method for spam message detection according to an embodiment of the invention.

FIG. 2 is a block diagram of a method for spam message detection according to an embodiment of the invention. As described above, the types of each message source can be determined based on its frequency domain transmission characteristic. Therefore, the method for spam message detection according to an embodiment of the invention includes:

At step 201, time domain transmission characteristic of a message source is collected.

The time domain transmission characteristic of a message source can be obtained through a variety of channels. For example, the so called time domain transmission characteristic can actually be determined by the arrival time of the message. In other words, the network can identify only the time when a message arrives on the network side, and generally cannot identify the time when the message was transmitted from a message source. The arrival time of the message can be determined for example, from Call Detail Record (CDR) or various databases. It should be obvious to one skilled in the art that various other techniques may be used to determine the arrival time of the message, and all such methods and techniques fall within the scope of the embodiments of the invention.

At step 202, frequency domain transmission characteristic of the message source is computed with the time domain transmission characteristic of the message source.

At step 203, it is determined whether the frequency domain transmission characteristic of the message source meets a predefined condition, and if so, the message source is identified as a spammer.

The predefined condition can include a variety of forms which match the frequency domain transmission characteristic of a predefined spammer template, or do not match the frequency domain transmission characteristic of a predefined non-spammer template. In particular, the frequency domain transmission characteristic of a message source is generally represented by a set of parameters. Variance of this set of parameters can be computed. If the variance of these parameters is greater than a variance threshold, the message source may be considered to be a spammer. This is typically because a spammer cannot transmit messages in an identical random manner as a normal user does, and thus its frequency domain transmission characteristic always have relatively obvious peaks and valleys, which corresponds to relative large variance of the parameters of frequency domain transmission characteristic.

While frequency domain transmission characteristic of an ordinary message source that transmits messages randomly is similar to white noise, its spectral distribution is relatively smooth, which corresponds to relative small variance of the parameters of frequency domain transmission characteristic. Thus, the number of message sources for which parameter comparison is required is reduced, thereby increasing the processing speed.

Next, the implementation of steps 202 and 203 will be described in detail, especially in a case where the predefined condition is that frequency domain transmission characteristic of a predefined spammer template are matched. According to one embodiment, when a frequency domain transmission characteristic of a message source is computed with time domain transmission characteristic of the message source, the time domain transmission characteristic is transformed into a frequency domain transmission characteristic by using Fourier transformation.

Fourier transformation is a known technique that is well know to a person skilled in the art and for the sake of brevity, is not described in this document. After obtaining frequency domain transmission characteristic by application of Fourier transformation, it can be determined whether the frequency domain transmission characteristic matches the frequency domain transmission characteristic of the predefined spammer template by comparison of the frequency domain transmission characteristic of the message source and the predefined spammer template.

However, a drawback that exists in obtaining frequency domain transmission characteristic through Fourier transformation is that Fourier transformation is dependent on discrete sampling. Discrete sampling causes spectrum extension and spectrum aliasing, thereby introducing noise into the spectrum. Noise often overwhelms the desired frequency domain transmission characteristic, leading to accuracy degradation. However, overcoming the influence of noise to achieve the required accuracy requires increasing the order of the Fourier transformation, leading to a corresponding increase in memory overhead for caching data for the time domain transmission characteristic and computation overhead for performing the Fourier transformation and parameter comparison.

Therefore, in an embodiment of the invention, frequency domain transmission characteristic of a message source are estimated by using a model. It is then determined whether the frequency domain transmission characteristic matches frequency domain transmission characteristic of a predefined spammer template. If there is a match the message source will be a considered a spammer. According to a present embodiment of the invention, a model such as an Autoregressive (AR) model, an Autoregressive Moving Average (ARMA) model or a Moving Average (MA) model is established for the message source. Since there is no feedback of output to input in the system acting as a message source, preferably, the message source is modeled as an Autoregressive (AR) model. The definition of a M-order Autoregressive model is:

$$x(t) = \sum_{m=1}^{M} a_m x(t-m) + \varepsilon(t) \qquad (1)$$

According to the model, value of x at a current time point is a linear combination of the values of x at past M time points plus white noise $\varepsilon(t)$, whose average value is zero and variance is computed as $\sigma^2$.

$a_1 \ldots a_M$ are M model parameters which constitute the model's parameter set. $\sigma^2$ is model gain. Thus, estimating frequency domain transmission characteristic of the message source estimates these model parameters and model gain in an AR model for the message source. However, comparing a frequency domain transmission characteristic with pre-defined spammer template implies comparing corresponding model parameters, and the model gain $\sigma^2$ will not be compared. The following will explain why the model gain $\sigma^2$ is not compared. With this kind of method, the number of parameters to be compared can be set flexibly.

Next, estimating the model parameters in an AR model by using time domain transmission characteristic of a message source will be described. For a message source, the number of messages transmitted within a time period is typically detected by using a sliding window. For an M-order AR model, the sliding window has M+1 panes each corresponding to a time domain sample interval, and assumes that the length of the time domain sample interval is P. The number of messages transmitted by the message source in any one of the time domain sample intervals can be easily determined. At time point 0, value of each pane is zero, and at time point P, the number of messages transmitted by the message source in the time period from time point 0 to time point P is computed as a value of a first pane. At time point 2P, the number of messages transmitted by the message source in the time period from time point P to time point 2P is computed as the value of a second pane.

This process is continued until time point (M+1)P, where the number of messages transmitted by the message source in the time period from time point MP to time point (M+1)P is computed as value of a M+1$^{th}$ pane. Thereafter, at time point (M+2)P, let the value of the first pane be equal to that of the second pane, the value of the second pane equal to that of the third pane, and so on until the value of the M+1$^{th}$ pane is equal to the number of messages transmitted by the message source in the time period from time point (M+1) to time point (M+2)P.

Thus sliding windows are formed. Compared to the embodiment that utilizes Fourier transformation, the setting of length of time domain sample interval is more flexible. This is because the embodiment that utilizes Fourier transformation needs to collect each piece of message, while the present embodiment needs to collect statistics on the total number of messages in a certain interval.

At time point (M+1)P, autocorrelation of each value in M+1 panes of the sliding window is computed, using:

$$R(m) = \frac{\sum_{t=1}^{M+1-m} x(t)x(t+m)}{M+1-m} \qquad (2)$$

Where R(m) indicates the autocorrelation factor. The value of M+1 autocorrelations can be computed according to each value in the panes of current sliding window. When the sliding window slides, the value of the first pane of the sliding window is discarded. The advantage is that computations are performed according to each value in the panes of the current sliding window only at a time point that computation of autocorrelation is required, so that at another time point, the value of each of the panes in the sliding window only needs to be updated.

Autocorrelation can be quasi-autocorrelation, which can be computed according to the following formulas first at every P time point starting from time point (M+1)P:

$$R'(0) = \sum_{t=1}^{T} x^2(t)$$

$$R'(1) = \sum_{t=1}^{T-1} x(t)x(t+1)$$

$$\ldots$$

$$R'(M) = \sum_{t=1}^{t-M} x(1)x(t+M)$$

where T is a natural number that is not less than M+1. The value of corresponding autocorrelation is computed according to the following formula:

$$R(m) = \frac{R'(m)}{T-m} \qquad (3)$$

where, m is an integer that is not less than 0 but not great than M. The advantage here is that the number of messages transmitted at all time domain sample intervals starting from time point 0 can be considered for computation.

Thus a total of M+1 values ranging from R(0) to R(M) can be computed. With this M+1 values and in conjunction with Formula (1) given above, M+1 equations as shown below can be formed, so that M model parameters $a_1$ to $a_M$ and model gain $\sigma^2$ can be resolved.

$$\begin{pmatrix} R(0) & R(1) & R(2) & \ldots & R(M) \\ R(1) & R(0) & R(1) & \ldots & R(M-1) \\ R(2) & R(1) & R(0) & \ldots & R(M-2) \\ \vdots & \vdots & \vdots & \vdots & \vdots \\ \vdots & \vdots & \vdots & \vdots & \vdots \\ \vdots & \vdots & \vdots & \vdots & \vdots \\ R(M) & R(M-1) & R(M-2) & \ldots & R(0) \end{pmatrix} \begin{pmatrix} 1 \\ a_1 \\ a_2 \\ \vdots \\ \vdots \\ \vdots \\ a_M \end{pmatrix} = \begin{pmatrix} \sigma^2 \\ 0 \\ 0 \\ 0 \\ 0 \\ 0 \\ 0 \end{pmatrix} \qquad (4)$$

It can be illustrated by a person skilled in the art that when $a_1$ to $a_M$ are all real numbers, the transfer function of the system can be represented as:

$$H(z) = \frac{\sigma}{\sum_{i=1}^{M} a_i z^i} \quad (5)$$

Using the method disclosed above, the frequency domain transmission characteristic of the message source can be determined once $a_1$ to $a_M$ and $\sigma^2$ are estimated. For example, by comparing computed $a_1$ to $a_M$ of the message source with that of the spammer template, it can be determined whether frequency domain transmission characteristic of the message source matches the predefined spammer template, thereby determining whether the message source is a spammer. Again, for example, experimentally it has been found that for two message sources having different time periods, if a first message source transmits more messages than a second message source at the arrival of each time period, then $\sigma^2$ of the first message source is larger than that of the second message source.

Since $\sigma^2$ can be estimated through R(0), which means that R(0) can be taken as a standard for preliminary filtering. If R(0) of a message source is larger than an average power threshold, then the message source is considered to be a spam message source. Only R(0) needs to be computed at preliminary filtering, so that the need to compute R(1)~R(M) does not arise, and hence there is no need to resolve $a_1$ to $a_M$ and to compare $a_1$ to $a_M$. R(0) is often referred to as the signal's average power. While computing R(0), either only value of each pane in current sliding window is to be considered or it can be obtained by computing the quasi-autocorrelation first and then derived using Formula (3).

With the method according to embodiments of the present invention, length of the time domain sample interval can be set flexibly. The number of parameters to be compared, i.e. M, can also be set flexibly. However, frequency domain transmission characteristic of a spammer, such as the period used, may not be the same. If the length of time domain sample interval is relatively long, then a spammer that uses shorter time period cannot be captured, and if the length of time domain sample interval is relatively short, capturing a spammer that uses longer time period, leads to overheads as too many sample points are required.

Yet a further embodiment of the invention will be described below. According to the Time Domain Sampling Theory, for a spectrum limited signal f(t), if the frequency is between 0 to $f_m$, then the signal f(t) can be uniquely represented without distortion by a series of time domain sampling values having equal interval only if the interval of time domain sampling is not greater than $1/(2f_m)$, or the sampling frequency is not lower than $2f_m$. Thus, if P is the length of time domain sample interval to perform time domain sampling, then that time domain sampling can, without distortion, represent a signal whose frequency is lower than ½P. If the number of samples is N, then the sampled sampling value only exists between a time range of 0 to NP. Therefore, signals whose time period is longer than NP cannot be represented by the time domain sampling. Thus, the range between 1/NP to ½P is the effective discrimination interval of the time domain sampling whose length of time domain sample interval is P and the number of samples is N versus frequency domain characteristic.

For example, if P takes the following values P1=4, P2=16, P3=128 and P4=1024 (where the unit of measurement can be "second" or any suitable time unit), then the corresponding effective discrimination intervals are:

Interval1: ¼N to ⅛,
Interval2: 1/16N to 1/32,
Interval3: 1/128N to 1/256,
Interval4: 1/1024N to 1/2048.

Where the number of samples N>2, the length of interval1 to interval4 decreases in turn. Using higher frequency domain discrimination in a shorter effective discrimination interval, and using lower frequency domain discrimination in a longer or higher effective discrimination interval may be used. In other words, use lower frequency domain discrimination in an effective discrimination interval of high frequency end, and use higher frequency domain discrimination in effective discrimination interval of low frequency end. According to frequency domain sampling theory, for a time limited signal f(t), existing in time range from 0 to $t_m$, the condition that the signal f(t) can be uniquely and distortionlessly represented by value of frequency domain sampling performed on that signal's spectrum F(f) with equal interval is considered to be the interval of frequency domain sampling that is not greater than $1/t_m$. Thus, discrimination of frequency domain characteristic obtained by time domain sampling whose length of time domain sample interval is P and the number of samples is N must be 1/NP at the minima. 1/NP can be used as the discrimination in various effective discrimination intervals.

The analysis described above can be applied in the model estimation method presented in one embodiment, for example multiple frequency domain transmission characteristic of a message source under multiple length of time domain sample interval are estimated with a multitier model, then it is required to determine whether the multiple frequency domain transmission characteristic match multiple predefined spammer templates respectively. If any one of the spammer templates is matched, then the message source is determined as a spammer. In particular, a spammer that uses short time periods can be captured by using shorter length of time domain sample interval with lower frequency domain discrimination, and a spammer that uses long time period can be captured by using longer length of time domain sample interval with higher frequency domain discrimination.

Generally, after a match occurs, sampling on the message will be stopped. This ensures that spammers that use short period are captured, and excessive overhead caused by too many samples is avoided. Preferably, the length of longer time domain sample interval is an integer multiple of that of a shorter time domain sample interval. Advantageously, the number of messages transmitted by the message source in a longer time domain sample interval can be obtained by summing up the number of messages transmitted by the message source in several shorter time domain sample intervals.

In particular, if four spammer templates need to be established, a total of four types of time domain sample intervals P1 to P4 will be used. P1 to P4 are used to perform sampling on a same message source respectively, that is, at every P1, the number of messages arrived corresponding to that message source in that P1 interval is computed. Similarly, the same is repeated for the other intervals P2, P3 and P4. For each type of time domain sample interval, the method includes estimating the system transfer function, i.e., the respective model parameters are estimated. The estimated model parameters are compared with that of the spammer template to determine whether a match exists; and if for any of the spammer templates a match is found, then the message source is determined as a spammer.

Next, the parameter comparison process according to yet a further embodiment of the invention will be described in detail in conjunction with experimental result. It will be readily recognized by a person skilled in the art that the following method is also equally applicable to the other embodiment disclosed herein. A model having a same form as that of a message source is established for a spammer. The model parameter set of a spammer template can be set manually, or it can be obtained by collecting statistics on frequency domain transmission characteristic of a great number of known spammers.

FIG. 3(A) to 3(D) shows distribution of model parameters computed for four different types of time domain sample interval and for a relatively large number of known spammers, where P1=4, P2=16, P3=128 and P4=1024 are the length of time domain sample interval, N is fixed to 11, this implies M is 10, and four sets of $a_1$ to $a_M$ can be obtained. As disclosed above, although $\sigma^2$ can also be obtained when $a_1$ to $a_M$ is obtained, $\sigma^2$ is primarily used for preliminary filtering, and will no longer be considered when comparing with spammer template. Each of the model parameters is located in interval of $[-1, 1]$, thus dividing the interval into 32 sub-intervals, what is shown by FIG. 3(A) to 3(D) is number of message sources whose model parameters fall into each sub-intervals.

Reference is now made to FIG. 3(A), which represents a distribution of model parameters in cases where the length of the time domain sample interval is 4. Each column represents one of $a_1$ to $a_M$. The first column in the left represents distribution of $a_1$. The first row of the first column in the left is 0, indicating that none of the known spammer has model parameters within interval $[15/16, 1]$. The $16^{th}$ row of the first column in the left is 31, indicating that 31 of the known spammers have model parameters are within interval $[0, 1/16]$. FIGS. 3(A) to 3(D) illustrate various methods for collecting statistics such as weighted average, which can then be utilized to compute respective model parameters $a_1$ to $a_M$ of the four spammer templates corresponding to P1 to P4.

It should be noted that the number of sub-intervals, the order of the model and the number of spammer templates are all illustrative, and those skilled in the art will easily realize that various other suitable settings can be used and these fall within the scope of the embodiments of the present invention.

After obtaining the model parameters for the spammer template, the model parameters for the message source can be compared with that of the spammer template to determine whether there is a match. According to a match determination method based on distance, the model parameters are considered as a M-dimension space, each set of model parameters $a_1$ to $a_M$ being regarded as a point in space, distance such as Euclidean distance between model parameters for the message source and that of the spammer template is computed to determine if the distance meets a predefined condition. The predefined condition for example can be set such that the Euclidean distance computed does not exceed a distance threshold then a match is considered to be successful.

Alternatively, a template of other types of message source besides a spammer can be introduced. The Euclidean distance between model parameters of the message source and that of the spammer template, and Euclidean distance between model parameters of the message source and that of a non-spammer template can be computed. The predefined condition is that if the former is smaller, then typically the message source matches the spammer template. It should be obvious to a person skilled in the art that there are many other methods on comparing sets of parameters to determine a match, and such method fall within the scope of the embodiment of the present invention.

Figure 4:
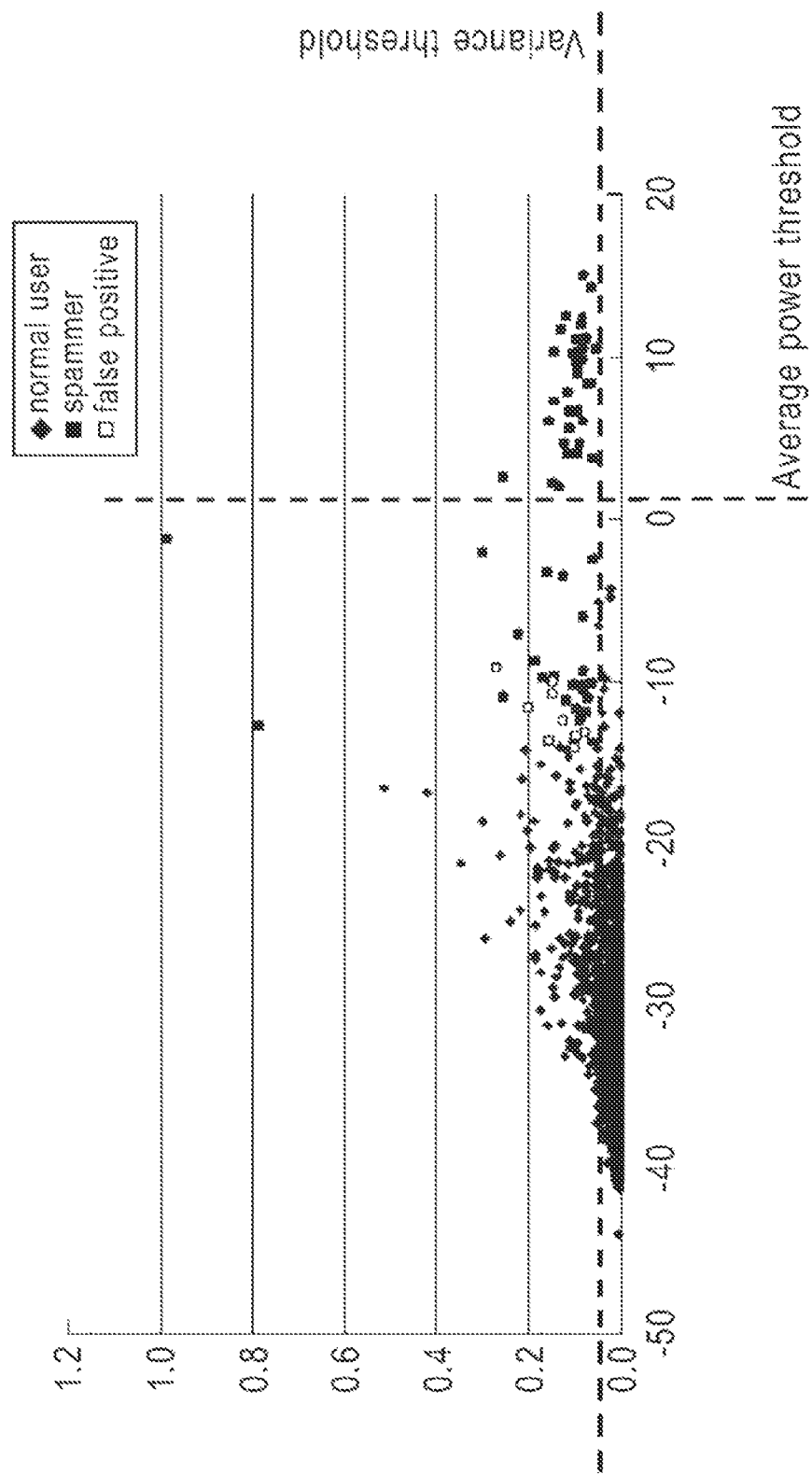
FIG. 4 is result of spam message detection according to an embodiment of the invention.

FIG. 4 illustrates detection of the method for spam message detection according to an embodiment of the invention. Each point in the figure represents a message source, having approximately 2,000,000 message sources, and the number of messages detected being approximately 40,000,000. P1=4, P2=16, P3=128 and P4=1024 are length of time domain sample interval, M is fixed to 10. The horizontal axis exemplarily represents R(0), and the vertical axis exemplarily represents variance of model parameters of message sources. If R(0) of the message source is greater than an average power threshold, then the source is considered to be a spammer, and if the variance of the model parameters of the message source is lower than a variance threshold, then the message source is not a spammer. For a message source whose R(0) is less than an average power threshold but whose variance of model parameters is higher than a variance threshold, to be a spammer, its model parameters should match that of a spammer template.

To verify the correctness of the models, it is manually determined whether an individual message source whose message transmission speed is larger than a transmission speed threshold is indeed a spammer. It can be seen from FIG. 4 that, there is no false negative in the message sources that have been determined manually, but there exists a few false positives. However, since the number of messages detected is approximately 2,000,000, the false positive rate is appreciably low.

Embodiments of the present invention may include several additional steps to improve correctness and speed of determination. As mentioned above, average power threshold and variance threshold can be used for preliminary filtering. Again, for example, detection based on message transmission speed can be further include between step 201 and step 202, the message source whose transmission speed is larger than a transmission speed threshold is regarded as a spammer. Further, a Leaky Bucket mechanism can be employed between step 201 and step 202, so that the message source whose transmission speed is larger than a transmission threshold and time length reaches a time length threshold is regarded as a spammer. Transmission speed threshold and time length threshold can also be used as a criterion for triggering step 202.

Again, for example, in step 201, preliminary filtering can be performed based on whether a new session is established. The process enters into step 202 only when it is determined that the arrived message has established a new session. In this way, two parties that transmit messages with high speed can be excluded from being a spammer.

Figure 5:
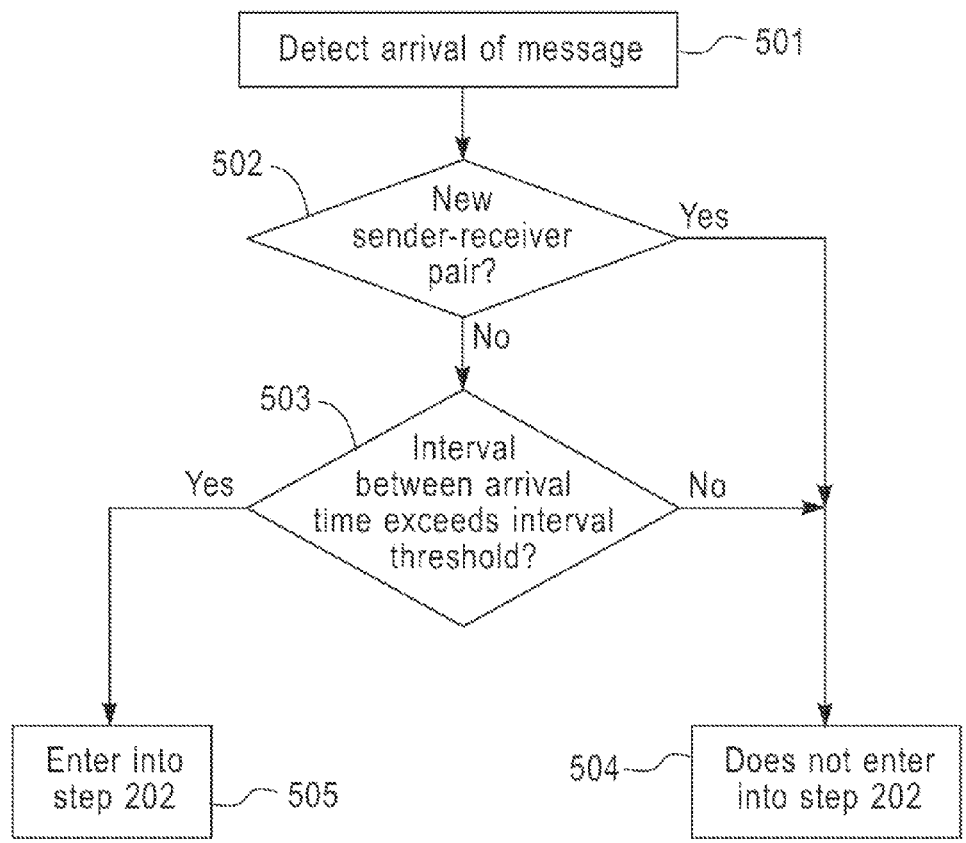
FIG. 5 is a flowchart of session detection according to an embodiment of the invention.

The specific method is shown in FIG. 5. At step 501, arrival of a message is detected. At step 502, based on the message's sender and receiver, it is determined whether the sender and receiver is a new sender-receiver pair, and if so, the process proceeds to step 505, otherwise, to step 503.

At step 503, in response to negative determination on the sender-receiver pair, it is determined whether the interval between the arrival time of the message and a previous message corresponding to the same sender-receiver pair exceeds an interval threshold, if so, the process proceeds to step 505, else, to step 504.

At step 504, considering that a new session is not established, the process does not enter into step 202.

At step 505, considering that a new session is established the process will enter into step 202.

Step 503 is optional. It can be considered that a new session is not established as long as it is determined that message's sender-receiver pair already exists.

In the above description, it should be noted that the spammer is described as an entity that transmits messages periodically. However, embodiments of the invention are not limited in a sense to be used to detect a spammer that transmits messages periodically. Even if the spammer's time domain transmission characteristic appear as random transmission through certain means, its frequency domain transmission characteristic still present a feature that is different from the frequency domain transmission characteristic of an ordinary message source, such that it can be detected by the method as disclosed in the embodiments of the present invention.

Figure 6:
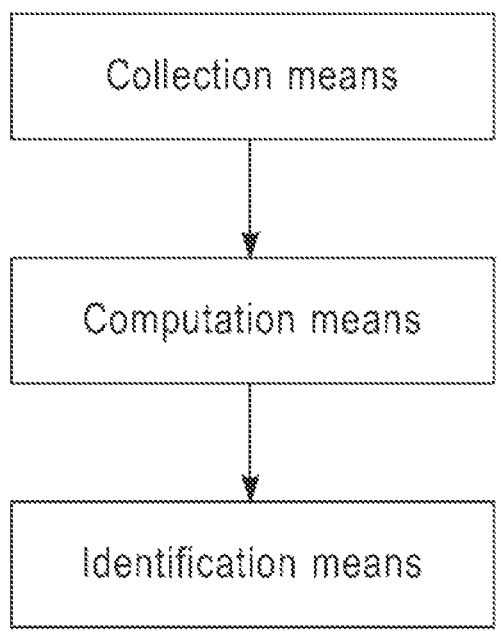
FIG. 6 is a block diagram of an apparatus for spam message detection according to an embodiment of the invention.

FIG. 6 is a block diagram of an apparatus for spam message detection according to an embodiment of the invention. The apparatus includes: a collection means configured to collect time domain transmission characteristic of a message source; a computation means configured to compute frequency domain transmission characteristic of the message source with the time domain transmission characteristic of the message source; and an identification means configured to determine the message source as a spammer in response to the frequency domain transmission characteristic of the message source meets a predefined condition.

Figure 7:
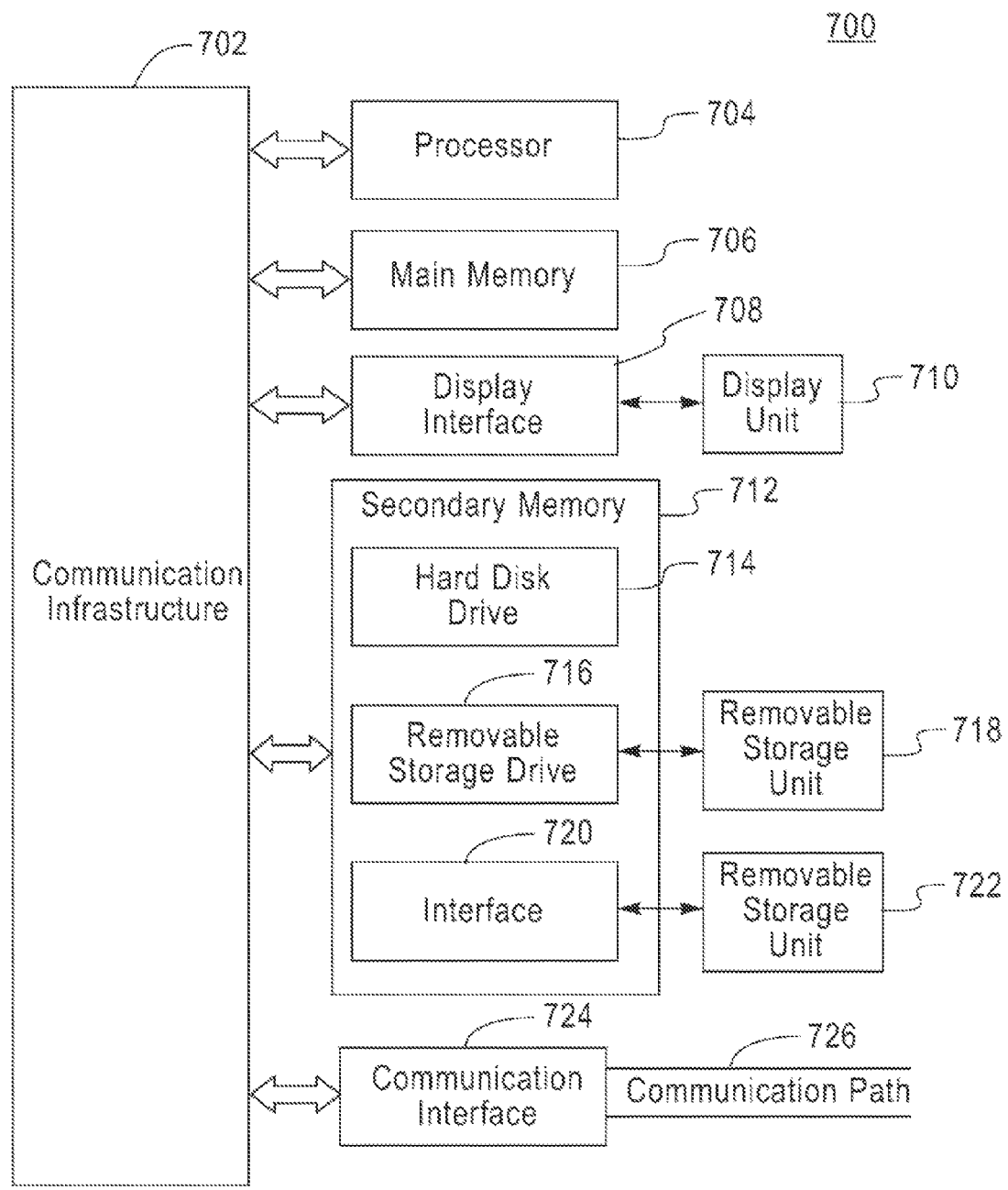
FIG. 7 is a detailed schematic of a data processing system used for implementing the exemplary embodiments of the invention.

FIG. 7 shows a detailed schematic of a data processing system, hereinafter referred to as a computer system, used to implement the exemplary data flow embodiments as illustrated in previous figures. The computer system 700 includes at least a processor 704. It should be understood although FIG. 7 illustrates a single processor, one skilled in the art would appreciate that more than one processor can be included as needed. The processor 704 is connected to a communication infrastructure 702 (for example, a communications bus, cross-over bar, or network) where the communication infrastructure 704 is configured to facilitate communication between various elements of the exemplary computer system 700. Various software embodiments are described in terms of this exemplary computer system. After reading this description, it will become apparent to a person of ordinary skill in the relevant art(s) how to implement the invention using other computer systems and/or computer architectures.

Exemplary computer system 700 can include a display interface 708 configured to forward graphics, text, and other data from the communication infrastructure 702 (or from a frame buffer not shown) for display on a display unit 710. The computer system 700 also includes a main memory 706, which can be random access memory (RAM), and may also include a secondary memory 712. The secondary memory 712 may include, for example, a hard disk drive 714 and/or a removable storage drive 716, representing a floppy disk drive, a magnetic tape drive, an optical disk drive, etc. The removable storage drive 716 reads from and/or writes to a removable storage unit 718 in a manner well known to those having ordinary skill in the art. The removable storage unit 718, represents, for example, a floppy disk, magnetic tape, optical disk, etc. which is read by and written to by the removable storage drive 716. As will be appreciated, the removable storage unit 718 includes a computer usable storage medium having stored therein computer software and/or data.

In exemplary embodiments, the secondary memory 712 may include other similar means for allowing computer programs or other instructions to be loaded into the computer system. Such means may include, for example, a removable storage unit 722 and an interface 720. Examples of such may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to the computer system 700.

The computer system 700 may also include a communications interface 724. The communications interface 724 allows software and data to be transferred between the computer system and external devices. Examples of the communications interface 724 may include a modem, a network interface (such as an Ethernet card), a communications port, a PCMCIA slot and card, etc. Software and data transferred via the communications interface 724 are in the form of signals which may be, for example, electronic, electromagnetic, optical, or other signals capable of being received by communications interface 724. These signals are provided to the communications interface 724 via a communications path (that is, channel) 726. The channel 726 carries signals and may be implemented using wire or cable, fiber optics, a phone line, a cellular phone link, an RF link, and/or other communications channels.

With reference to the embodiments disclosed, the terms "computer program medium," "computer usable medium," and "computer readable medium" are used to generally refer to media such as the main memory 706 and the secondary memory 712, the removable storage drive 716, a hard disk installed in the hard disk drive 714, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage.

It can be used, for example, to transport information, such as data and computer instructions, between computer systems. Furthermore, the computer readable medium may include computer readable information in a transitory state medium such as a network link and/or a network interface, including a wired network or a wireless network that allows a computer to read such computer readable information.

Computer programs (also referred to herein as computer control logic) are stored in the main memory 706 and/or the secondary memory 712. Computer programs may also be received via the communications interface 724. Such computer programs, when executed, can enable the computer system to perform the features of exemplary embodiments of the present invention as discussed herein. In particular, the computer programs, when executed, enable the processor 704 to perform the features of the computer system 700. Accordingly, such computer programs represent controllers of the computer system.

It may be appreciated by a person skilled in the art that, the above method and system can be implemented by using computer executable instructions and/or included in processor control codes, which are provided on carrier medium such as disk, CD or DVD-ROM, programmable memory such as read-only memory or data carrier such as optical or electrical signal carrier. The apparatus/system for spam message detection and its components can be implemented by hardware circuit such as large scale integrated circuit or gate arrays, semiconductors such as point logic chip or transistors, or programmable hardware devices such as field programmable gate array, programmable logic device, or can be implemented by software executed by various types of processors, or can be implemented by a combination of the above hardware circuit and software, such as firmware.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Although some exemplary embodiments of the present invention have been illustrated and described, those skilled in the art will appreciate that, changes to these embodiments can be made without departing from the principle and spirit of the invention, the scope of the invention is defined by claims and their equivalent transformations.

We claim:

1. A method for detecting a spam message, the method comprising:
   computing a frequency domain transmission characteristic of a message source using a time domain transmission characteristic of the message source; and
   identifying the message source as being a spammer based on the frequency domain transmission characteristic;
   wherein the steps of the method are carried out using a computer device.

2. The method of claim 1, further comprising:
   identifying the message source as a spammer in response to the frequency domain transmission characteristic of the message source not matching a frequency domain transmission characteristic of a non-spammer template.

3. The method of claim 1, further comprising:
   identifying the message source as a spammer in response to the variance of a parameter of the frequency domain transmission characteristic of the message source being greater than a variance threshold.

4. The method of claim 1, further comprising:
   computing an average power of the message source with the time domain transmission characteristic of the message source;
   identifying the message source as a spammer in response to the average power being greater than an average power threshold; and
   exiting the process.

5. The method of claim 1, further comprising:
   determining that a received message has established a new session in accordance with the time domain transmission characteristic of the message source; and
   computing the frequency domain transmission characteristic of the message source with the time domain transmission characteristic of the message source in response to the received message having established a new session.

6. The method of claim 1, further comprising:
   identifying the message source as a spammer in response to the frequency domain transmission characteristic of the message source matching a frequency domain transmission characteristic of a spammer template.

7. The method of claim 6, further comprising:
   estimating the parameter set of the model corresponding to the message source with the time domain transmission characteristic of the message source; and
   identifying the message source as a spammer in response to the parameter set of the model corresponding to the message source matching the parameter set of the model corresponding to the spammer template;
   wherein models having the same form are built for the message source and the spammer template, and the frequency domain transmission characteristic is represented by a parameter set of the model.

8. The method of claim 6, further comprising:
   estimating at least two parameter sets of the model corresponding to the message source with the time domain transmission characteristic of the message source by taking at least two different values as length of time domain sample intervals, respectively; and
   determining that the message source is a spammer in response to any one of the at least two parameter sets of the model corresponding to the message source matching any one of the parameter set of the model corresponding to the first spammer template and the parameter set of the model corresponding to the second spammer template;
   wherein the spammer template comprises at least a first spammer template and a second spammer template, and models having the same form are built for the message source, the first spammer template and the second spammer template.

9. The method of claim 8, wherein one of the at least two different values is a positive integer multiple of the other.

10. An apparatus for detecting a spam message, the apparatus comprising:
    computation means configured to compute a frequency domain transmission characteristic of a message source using a time domain transmission characteristic of the message source; and
    identification means configured to identify said message source as being a spammer based on the frequency domain transmission characteristic.

11. The apparatus of claim 10, further comprising:
    means configured to identify the message source as a spammer in response to the frequency domain transmission characteristic of the message source not matching the frequency domain transmission characteristic of a non-spammer template.

12. The apparatus of claim 10, further comprising:
    means configured to identify the message source as a spammer in response to a variance of parameter of the frequency domain transmission characteristic of the message source being greater than a variance threshold.

13. The apparatus of claim 10, further comprising:
    means configured to compute average power of the message source with the time domain transmission characteristic of the message source; and means configured to:
    identify the message source as a spammer in response to the average power being greater than an average power threshold; and
    exit the flow.

14. The apparatus of claim 10, further comprising:
    means configured to identify whether arrived message has established a new session according to the time domain transmission characteristic of the message source; and
    means configured to initiate the computation means in response to the arrived message having established a new session.

15. The apparatus of claim 10, further comprising:
    means configured to identify the message source as a spammer in response to the frequency domain transmission characteristic of the message source matching a frequency domain transmission characteristic of a spammer template.

16. The apparatus of claim 15, further comprising:
means configured to estimate the parameter set of the model corresponding to the message source with the time domain transmission characteristic of the message source; and
means configured to identifying the message source as a spammer in response to the parameter set of the model corresponding to the message source matching the parameter set of the model corresponding to the spammer template;
wherein models having the same form are built for the message source and the spammer template, and the frequency domain transmission characteristic is represented by a parameter set of the model.

17. The apparatus of claim 15, further comprising:
means configured to estimate at least two parameter sets of the model corresponding to the message source with the time domain transmission characteristic of the message source, taking at least two different values as length of time domain sample intervals, respectively; and
means configured to identify the message source as a spammer in response to any one of the at least two parameter sets of the model corresponding to the message source matching any one of the parameter set of the model corresponding to the first spammer template and the parameter set of the model corresponding to the second spammer template;
wherein the spammer template comprises at least a first spammer template and a second spammer template, and models having the same form are built for the message source, the first spammer template and the second spammer template.

18. The apparatus of claim 17, wherein one of the at least two different values is a positive integer multiple of the other.

19. A computer program product for detecting a spam message, the computer program product comprising:
a computer readable storage medium having computer readable program code embodied therewith, the computer readable program code comprising computer readable program code configured to execute a method, the method comprising:
computing a frequency domain transmission characteristic of a message source using a time domain transmission characteristic of the message source; and
identifying said message source as being a spammer based on the frequency domain transmission characteristic.

* * * * *